US007272073B2

(12) United States Patent
Pellegrini et al.

(10) Patent No.: US 7,272,073 B2
(45) Date of Patent: Sep. 18, 2007

(54) METHOD AND DEVICE FOR GENERATING INFORMATION RELATING TO THE RELATIVE POSITION OF A SET OF AT LEAST THREE ACOUSTIC TRANSDUCERS

(75) Inventors: Renato Pellegrini, Zurich (CH); Matthias Rosenthal, Dielsdorf (CH)

(73) Assignee: SonicEmotion AG, Oberglatt (CH)

( * ) Notice: Subject to any disclaimer, the term of this patent is extended or adjusted under 35 U.S.C. 154(b) by 290 days.

(21) Appl. No.: 10/515,505

(22) PCT Filed: May 20, 2003

(86) PCT No.: PCT/CH03/00323

§ 371 (c)(1),
(2), (4) Date: May 23, 2005

(87) PCT Pub. No.: WO03/101150

PCT Pub. Date: Dec. 4, 2003

(65) Prior Publication Data

US 2005/0226437 A1 Oct. 13, 2005

(30) Foreign Application Priority Data

May 27, 2002 (CH) .................................... 0882/02

(51) Int. Cl.
*H04B 3/00* (2006.01)
*H04B 5/00* (2006.01)
*H04R 3/00* (2006.01)
*H04R 1/10* (2006.01)
*G01S 3/80* (2006.01)

(52) U.S. Cl. ............................ 367/124; 381/1; 381/77; 381/74; 381/92; 367/125; 367/126; 367/127

(58) Field of Classification Search .................. 381/77, 381/111, 116, 79, 182, 1, 17, 74; 367/92, 367/138, 124, 125, 126
See application file for complete search history.

(56) References Cited

U.S. PATENT DOCUMENTS 5,142,506 A * 8/1992 Edwards ..................... 367/127

(Continued)

FOREIGN PATENT DOCUMENTS

DE 26 18 381 A 11/1977

(Continued)

*Primary Examiner*—Vivian Chin
*Assistant Examiner*—Devona E. Faulk
(74) *Attorney, Agent, or Firm*—Buchanan Ingersoll & Rooney, PC

(57) ABSTRACT

The invention relates to a method and device for generating data about the mutual position of at least three acoustic transducers. The aim of the invention is to make it possible to continuously measure and calculate the mutual position of at least three acoustic transducers, particularly the rotation and the position of a human head wearing headphones within a room without using any additional transmitter element on the head, headphone, or body of the listener, during audio playback. This aim is achieved by connecting the acoustic transducers to a digitally operated system which comprises an output path emitting audio signals to first and second acoustic transducers, an input path receiving audio signals from the third acoustic transducer, an audio signal source that is connected to the output path, an ultrasound generator that is connected to the output path, and an information generator which indicates a position and is connected to the input path.

8 Claims, 3 Drawing Sheets

U.S. PATENT DOCUMENTS

| | | | | |
|---|---|---|---|---|
| 5,379,269 | A * | 1/1995 | Sindeband et al. | 367/127 |
| 5,570,324 | A * | 10/1996 | Geil | 367/124 |
| 6,525,993 | B2 * | 2/2003 | Wake et al. | 367/127 |
| 6,678,381 | B1 * | 1/2004 | Manabe | 381/77 |
| 2001/0055397 | A1 | 12/2001 | Croft et al. | |

FOREIGN PATENT DOCUMENTS

| | | | |
|---|---|---|---|
| EP | 1 176 848 | A2 | 1/2002 |
| JP | 01 276 900 | A | 11/1989 |
| JP | 01276900 | A * | 11/1989 |
| JP | 01309500 | A * | 12/1989 |
| JP | 06 082 242 | A | 3/1994 |
| JP | 06082242 | A * | 3/1994 |
| WO | WO92/07346 | A1 | 4/1992 |
| WO | WO9207346 | A1 * | 4/1992 |

* cited by examiner

METHOD AND DEVICE FOR GENERATING INFORMATION RELATING TO THE RELATIVE POSITION OF A SET OF AT LEAST THREE ACOUSTIC TRANSDUCERS

FIELD OF THE INVENTION

The invention refers to a method and a device for generating information relating to the relative position of a set of at least three transducers designed for treating acoustic signals,

BACKGROUND OF THE INVENTION

In recent years, many different inventions have been proposed to detect and compute the rotation and position of a listener's head wearing headphones. One class of inventions proposes a transmitter which is mounted on the headphones. It is used for emitting a signal only, from which the head position and orientation can be extracted. The transmitted signal is either based on infrared, ultrasonic, or magnetic-field signals. A corresponding receiver will feed the received signal to a signal-processing unit where the rotation and/or position of the listener's head is calculated. Such device is disclosed in WO 92/07346.

Another class of inventions propose a gyrator or an angular velocity device, which is mounted on the headphone. In this case, the rotation of the head can be acquired just from the angular velocity device without any other receiver device. Such devices are used for example in digital cameras where hand movements are compensated. However, the drift of angular velocity devices can be significant. Therefore, this method is preferred for measuring relative motions only. Such device is disclosed in EP-1 176 848 A2.

A third class of inventions is a combination of the latter two methods. Therefore, an angular velocity device is used for measuring the head movements, whereas an additional ultrasonic or infrared transmitter and receiver are used to calibrate the drift of the angular velocity device.

Different methods also exist for tracking the listener's position in a room with loudspeakers. The most common method is to reproduce an audible signal using the loudspeakers and measure the delay using one or several microphones. The position of the listener can be computed from the known position of the loudspeakers and the measured delay. Until now, all methods and devices in that field measure the listener's position once before sound reproduction starts. After that, a fixed sweet spot exists where a listener has the best sound experience. Changing the sweet spot requires to stop the sound reproduction and to perform a new measurement.

JP 06 082242 discloses a device for calculating the position and orientation of a headphone in space using ultrasonic signals. In addition to the transducers used for the acoustical signal, three more transducers are fixed on the headphone for treating ultrasonic signals used for defining the position and orientation in space. Further three transducers are positioned in space for receiving ultrasonic signals. In this case a electrical or optical reference signal is transmitted from the headphone to the receivers of the ultrasonic signals and the delays of each ultrasonic signal is calculated and its emitter is determined. The reference signals are separated by using different frequency bandwidths. One drawback of this apparatus is to be seen in the fact that special transducers for determining the position and orientation are necessary in addition to the transducers used for acoustical signals. Also an electrical or optical reference signal has to be provided. This arrangement and the division of the ultrasonic signals into several frequency bands leads to a very sophisticated method for the treatment of the signals in order to determine the position and orientation of the headphone.

JP 01 276900 discloses a device with loudspeakers dispersed in a space and whereas the position of a listener should be determined. Therefore, the loudspeakers emit ultrasonic signals which are received by a receiver located on the listeners position. Starting from the different running times needed by said ultrasonic signals to reach the receivers, the position of the receiver or the listener can be determined. As no separate ultrasonic transducers are provided, the step of determining the position must be performed ahead of emitting the acoustical signal, that is the effective operation of the loudspeakers. The loudspeakers are in a fixed position and the position is therefore determined once only in advance to the operation of the loudspeakers. The position of the listeners head can not be measured continuously.

Both devices take advantage of correlating incoming ultrasonic signals to determine the position. That means that said devices use the signals having the most important amplitudes, but, such signals are often those who are reflected by other objects. For this reason, the position determined by such devices is heavily influenced in a negative manner by external conditions.

OBJECTS AND SUMMARY OF THE INVENTION

The major objective of this invention as claimed is to provide a method and apparatus for continuously measuring and calculating the relative position of at least three audio transducers and especially the rotation and the position of a listener's head wearing headphones within a space without any additional transmitter device attached to the listener's head, headphone or body during the session of listening to sound emitted.

The major objective of this invention is achieved by providing a first electric audio signal to a first transducer for transducing the first electric audio signal to a first acoustic signal, providing a second electric audio signal to a second transducer for transducing the second electric audio signal to a second acoustic signal, adding a first ultrasonic signal to the said first electric audio signal and a second ultrasonic signal to said second electric audio signal before such audio signals enter the said respective first and second transducer, then, emitting first and second combined acoustical and ultrasonic signals emitted from the said first and second transducers, sensing the said first and second combined acoustical and ultrasonic signals in a third transducer and converting them into a electrical signal, filtering out the ultrasonic signal from the sensed combined first and second signals, computing a first and a second delay signal from the said sensed and filtered first and second ultrasonic signals and computing from said first and second delay signal a signal representing the position of at least one transducer with respect to the at least two other transducers of the said set of three transducers.

Additionally a set of at least two transducers of the set may be in a fixed positional relationship. Then, according to the disclosed method, the position or orientation of at least two transducers having a fixed relative positional relationship with respect to the third transducer of the set can be calculated.

Then, a first set of at least two transducers for emitting acoustical signals which are separated by a fixed relative distance and a second set of at least two more transducers for receiving acoustical signals separated by a fixed relative distance may be arranged. Computing a signal representing the position and orientation of the said first or second set to the other first or second set is performed in a two-dimensional plane according to the invention.

Finally, a first set of at least three transducers for emitting or receiving acoustical signals which are separated by a fixed relative distance and a second set of at least two more transducers for emitting or receiving acoustical signals separated by a fixed relative distance may be arranged. Computing a signal representing the position and orientation of the said first or second set to the other first or second set is performed in three-dimensional space.

The device for performing the method according to the invention may comprise a first transducer, a second transducer and a third transducer. A digital system is connected to said at least first, second and third transducer and has an output audio path for feeding audio signals to at least one of said first, second and third transducers and an input audio path, for receiving audio signals from at least one of said first, second and third transducer. Then, a source of audio signals and a ultrasonic signal generator is comprised in said digital system. Both are connected to the said output audio path in said digital system. A position information generator is connected to the said input audio path. The device may further comprise a signal filter and analyzer connected to the position information generator in said input path, and the said first and second transducers may be the left and right side transducers of a headphone and said third transducer may be a stationary microphone. In an alternative embodiment, said first and second transducers may be stationary loudspeakers and said third transducer may be a movable microphone.

According to the invention, e.g. in the case of headphones, the built in transducers of standard headphones are used instead of added devices. More precisely, the transducers of the headphones are used for both, sound reproduction and ultrasonic emittance. The same is true for the loudspeakers: The transducers of the loudspeakers are use for emitting sound signals as well as for emitting ultrasonic signals. Therefore, any headphones without additional cabling can be applied. Additionally the position and orientation of the human head may be measured without interrupting the emittance of sound.

The present method and device refers to two types of applications namely head tracking and listener tracking, both during sound reproduction and both without an additional sender device.

The first type covers the field of all applications, where head tracking in combination with headphones is required or useful. Head tracking is the process of continuously keeping track of movements, that is the rotation and position changes of a human head wearing headphones. More particularly the invention relates to multimedia or game applications where a personal computer, a game console or any other device can use the three-dimensional position and rotation information of the users head.

Moreover, applications with headphones for telephone or radio transmission are covered, such as conference calls or airplane cockpits, where audio sources are "placed" in a virtual listening environment according to the head's rotation and position.

In a slightly different arrangement, the same invention can be used for tracking a listener in a listening room with a multi-loudspeaker sound installation. Such an installation can be a DVD reproduction system with five loudspeakers and one subwoofer or any other number of loudspeakers placed at arbitrary positions in the room. By tracking the listener in the room it is possible to adjust the sweet spot to the actual position of the listener. The sweet spot is the area in the room where the reproduction of sound from all loudspeakers is equalised and the best listening experience exists. Unlike other methods the present method and device allows to dynamically adjust the measurement of the listener's position during sound reproduction.

DETAILED DESCRIPTION OF A PREFERRED EMBODIMENT

Figure 1:
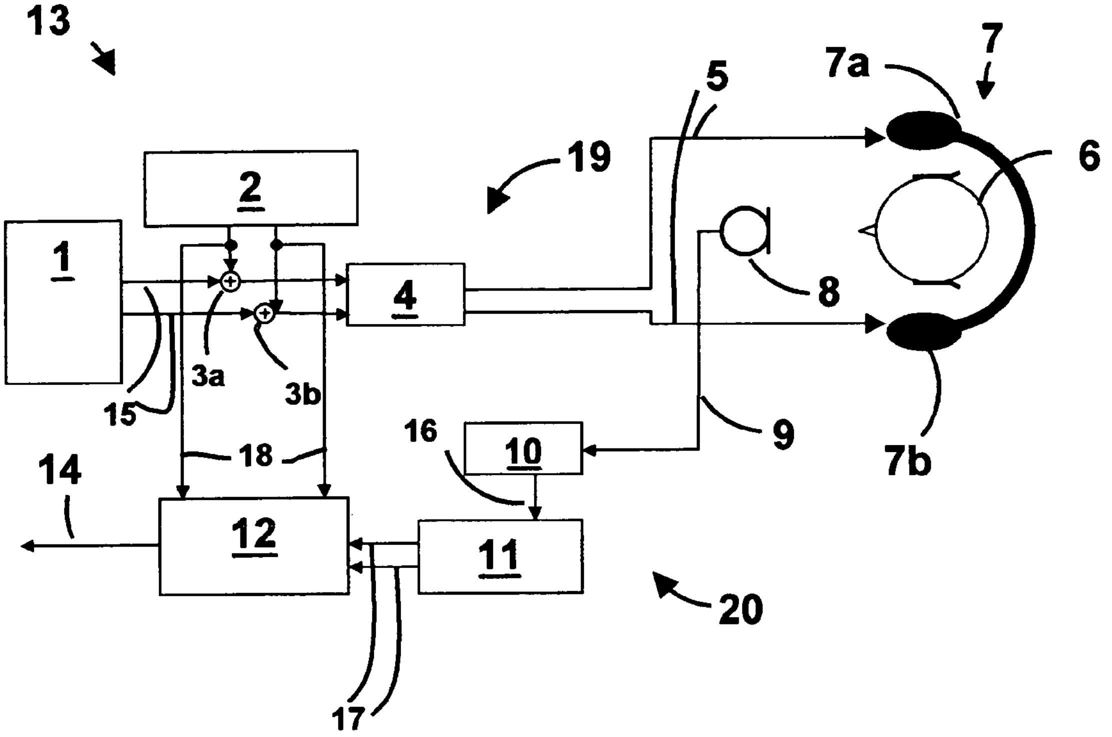
FIG. 1 is a schematic representation of a first embodiment of the invention.

As can be seen from FIG. 1, a headphone set 7 comprising a transducer or headphone 7*a* and 7*b* for the right and left ear is connected to a digital system 13 with audio capabilities by lines 5 or a wireless connection. Such digital system 13 can be or at least comprises a personal computer, a game station, a set-top box or any similar device known per se, which produces an audio signal for a listener 6. This digital system 13 therefore comprises a source 1 for emitting non-modified audio signals, a ultrasonic signal generator 2, which produces non-audible signals above audible frequencies, typically above 20 kHz and a digital to analog converter 4 (DAC 4). All three elements are connected via lines 15 and adders 3*a* and 3*b*. The source 1 for a non-modified audio signal may be a CD-player, a wave-file or any other source within or outside the system 13. This source 1 emits the audio signal that the listener 6 wants to listen to. Additionally, one or more transducer 8 such as microphones or ultrasonic receivers are positioned in front of the listener 6, and are connected by a transmission line 9 to the digital system 13. Again this transmission line 9 can be a cable or a wireless connection. An analogue to digital converter 10 (ADC 10) is connected via lines 16 and 17 to a signal filter and analyzer 11 and further to a position information block 12. The source 1 with lines 15, the converter 4 and lines 5 define an output audio path 19, whereas transmission line 9, the converter 10, the filter and analyzer 11 with lines 16 and 17 as well as the position information block 12 are elements of an input audio path 20.

In operation, this system 13 produces an audio signal which is emitted by the source 1 and transmitted through lines 15 and after conversion in the converter 4 through lines 5 to the first and second transducers 7*a*, 7*b* in the headphone 7 attached to a listeners head 6. Two distinct ultrasonic signals, one for each transducer 7*a* and 7*b* are emitted by the ultrasonic signal generator 2. The ultrasonic signal generator 2 produces at least two non-audible signals above 20 kHz which may use neighbouring frequency bands.

Another possibility is to use different time sequences, one sequence for the right transducer 7*a* and one sequence for the left transducer 7*b* in the headphone 7. Both sequences in the same frequency band above 20 kHz for both ultrasonic signals are emitted during a short alternating time span.

In both cases the ultrasonic signals are added to the audio signal in the lines 15 by means of the adders 3*a*, 3*b*. The ultrasonic signals are also converted in the digital to analog converter 4 and are sent together with the audio signal to the headphones 7*a*, 7*b*. The digital to analog converter 4 may be a common audio-converter having a sampling rate of 48 kHz. As now converters having a sampling rate of 96 kHz are also available, a ultrasonic signal having a frequency much higher than 24 kHz may be used. This ultrasonic signal may be converted back with the corresponding ADC 10, which operates at a sampling rate of 96 kHz.

The said ultrasonic signals are continuously emitted by the transducers 7*a* and 7*b*. The person wearing the headphone 7 will not hear the ultrasonic signals emitted by the transducers. A third transducer 8, such as a microphone or a receiver for ultrasonic waves positioned e.g. in front of the listener 6, will receive the ultrasonic signals.

Figure 2:
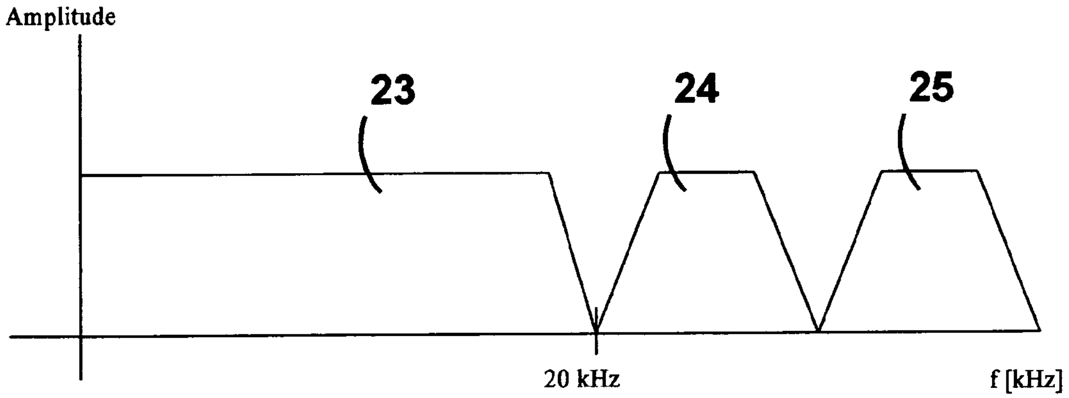
FIG. 2 is a representation of a filter characteristic as may be used in the said first embodiment.

Depending on the characteristics of the headphones 7, the emitted ultrasonic signal can be weak, because the attenuation of a signal in air as well as on absorbing materials above 20 kHz is rather strong. Normally, the signals can have any type of signal form. However, in order to still get a good signal quality and receive the ultrasonic signal at a distance of several meters, a band-limited white noise with pseudo-random phase is best fitted in this case. Suitable signals, such as maximum-length sequences are known to have an auto-correlation function with a clearly defined single maximum. Other possible signals include Golay sequences and a periodic-phase sequences that can improve detection accuracy in noisy environments. At least two signal adders 3*a* and 3*b* in the output path 19 are used where the output signal is the sum of the signals from the source 1 and the ultrasonic signal generator 2. A digital to analogue converter DAC 4 has at least two digital signal inputs connected to adders 3*a* and 3*b* and two analogue signal outputs. A transmission line 5, such as an electric cable or a wireless connection is used to transmit the signals from the system 13 to the headphones 7. A person's head 6 is wearing standard, usual in the trade headphones 7. The ADC 10 converts at least one analogue electrical signal as received by the transducer 8 into at least one digital signal. This received signal comprises the ultrasonic signals from both transducers 7*a* and 7*b*. The output signal of the ADC 10 will have a shape as shown in FIG. 2. In FIG. 2 signals are plotted over a horizontal axis having values of frequencies and adjacent to a vertical axis having values of the amplitude of the signal indicated thereon. As can be seen from FIG. 2 a frequency band 23 for a non-modified audio signal extends up to a frequency limit of approximately 20 kHz. Two distinct frequency bands 24 and 25 extend above the said frequency limit, whereas one frequency band 24 may be directed to the right transducer 7*a* and the frequency band 25 to the left transducer 7*b*. The signal filter and analyser 11 connected to the ADC 10 processes the signal received in a high-pass filter and filters out the frequency band below 20 kHz from the waveform of FIG. 2. The remaining signal only consists of possibly weak ultrasonic signals 24, 25 from the right transducer 7*a* and the left transducer 7*b* of the headphone 7. A second filter in said analyser 11 is provided to separate the two reconstructed ultrasonic signals into two individual signals one containing the ultrasonic signal 24 from the right transducer 7*a* of the headphone 7, and the other containing the signal 25 from the left transducer 7*b*. In the case, where the two ultrasonic signals are in adjacent frequency bands for either signal, the said second filter is a bandpass filter and it is applied for each frequency band. Using appropriate cross-correlation with the known input signal may improve the resulting signal to noise ratio. Such filtering techniques using cross-correlation are well known in the art and therefore not described in more detail here.

In the case where the two ultrasonic signals are temporal sequences with one sequence for the right transducer 7*a* of the headphones 7, and another sequence for the left transducer 7*b*, the said second filter is a decoder of the said sequences. As a result, for each receiver or microphone 8 the ultrasonic signal from the right and the left transducer of the headphone is separated and reconstructed in the filter and analyser 11 and both signals are then propagated to the position information block 12.

As such devices are most often operated in closed rooms, most probably several signals will be received by the receiver 8. Such ultrasonic signals are emitted by one specific transducer 7*a*, 7*b*. Due to reflexion on a wall or an object, a first signal issued by the same transducer 7*a*, 7*b* may directly reach the receiver 8 and a second signal may reach the receiver 8 indirectly after being reflected. Additionally the transducers 7*a*, 7*b* in the headphone may have strong directional effects. Therefore, the strongest signal reaching the receiver 8 may well be a reflected signal. Filter and analyzer 11 is therefore designed in such a manner as to detect and separate the signal reaching the receiver first instead of the signal having the biggest amplitude.

Figure 3:
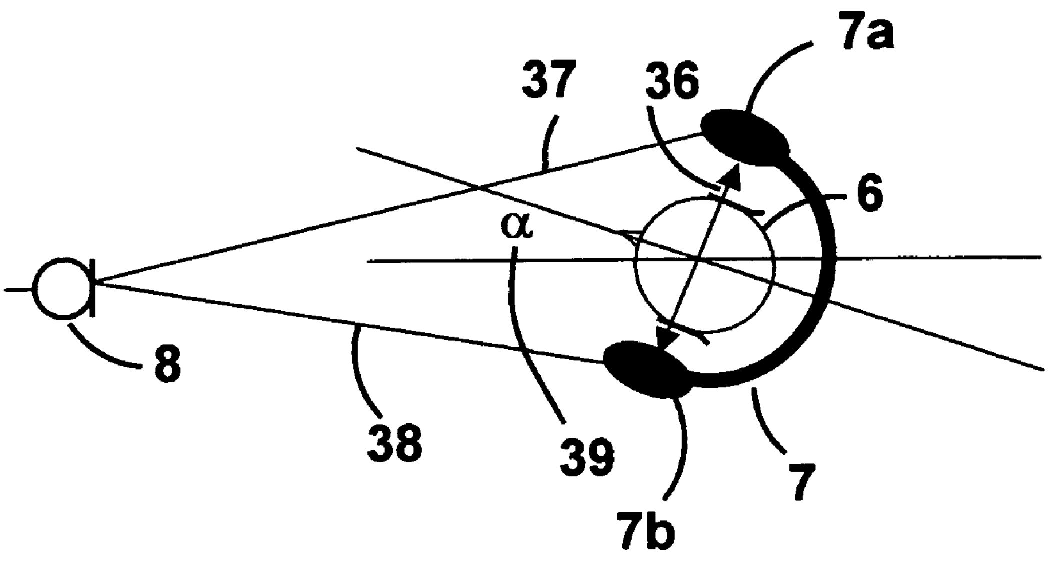
FIGS. 3 and 4 are schematic views of the position of several components present in the said first embodiment.

The position information block 12 will also receive the original ultrasonic signal as emitted by line 18 from the ultrasonic generator 2 together with the reconstructed ultrasonic signal received from filter 11 over line 17. He can now compare the original ultrasonic signal with the reconstructed ultrasonic signal by means of a digital signal cross-correlation. Two delays, for the left and the right signal, respectively, result individually for each receiver or microphone 8 depending on the distance between the respective first and second transducer 7*a*, 7*b* and the third transducer or receiver 8. If one receiver or microphone 8 is used, the rotation or orientation of the listener's head 6 can be computed through their relative distance to the receiver 8. As will be explained using FIG. 3, the difference of the delays, as explained above, delivers the information about the difference of the distances 37, 38 of the right transducer 7*a* to the microphone 8 and of the left transducer 7*b* to the microphone 8. The rotation of the head 6, expressed in the angle $\alpha$, 39, can be computed through known triangulation procedure knowing the real or average diameter of a person's head. A more exact calibration based on the individual head size is easily feasible through personal measurements. The average of the two distances 37 and 38 gives the information about the absolute distance from the centre of the head 6 to the receiver 8.

Figure 4:
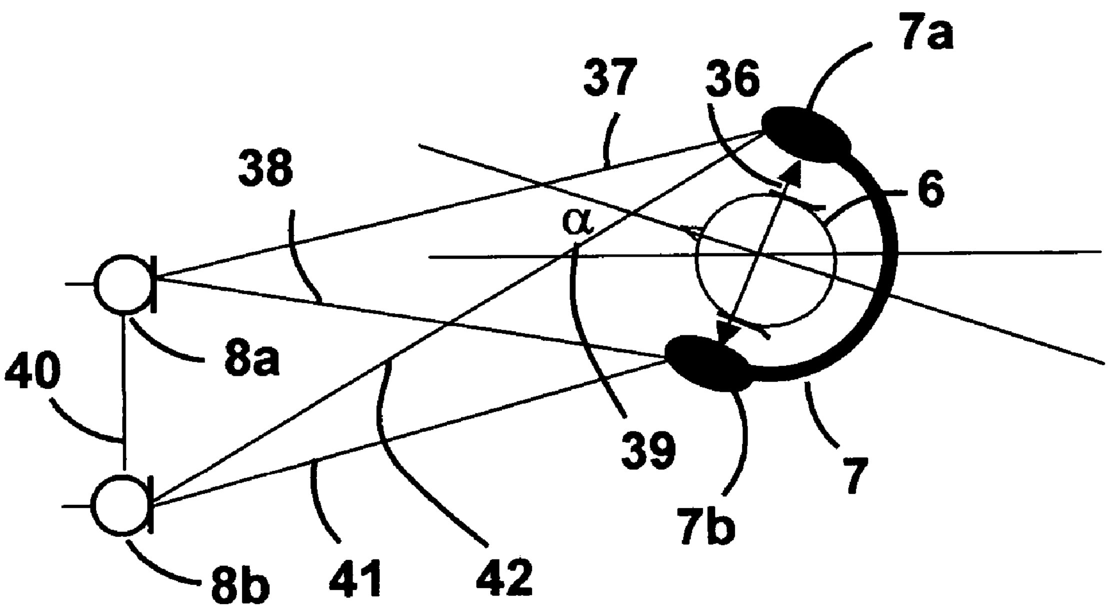

In case of two receivers 8*a* and 8*b*, shown in FIG. 4, the rotation and a two-dimensional exact position of the head 6 with respect to the receivers 8*a*, 8*b* can be calculated with more accuracy. As above, it can be computed through triangulation with the additional information of the two distances 41 and 42 to the second receiver 8*b* and the distance 40 between the two receivers 8*a* and 8*b*. In this and in the above mentioned case the transducers are located in one plane, which is identical to the plane of the said figure or which is parallel to said plane.

In case of three and more receivers, the rotation and the exact position in three dimensions is also computable.

Again, it can be computed through triangulation with the additional information of the distances between all receivers.

After the described computation performed by the position information block 12, the information about the rotation and the position is then available in digital form as a signal in line 14 (FIG. 1). It can be used by an application running on the digital system. In most cases, the audio-visual content provided to the user through displays, loudspeakers, headphones, etc. is modified depending on the head's rotation and position.

Figure 5:
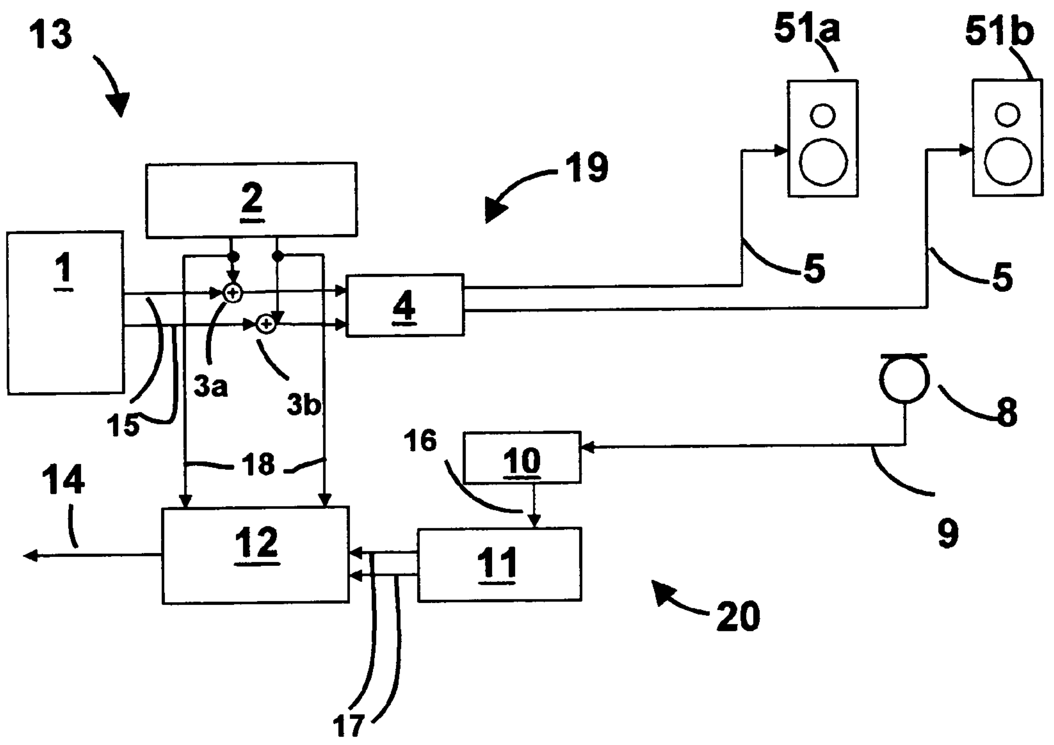
FIG. 5 is a schematic representation of a second embodiment of the invention and FIG. 6 is schematic view of the position of several components present in the said second embodiment.

A second embodiment of the invention is shown in FIG. 5. In FIG. 5, the same digital system 13 with audio capabilities as known from FIG. 1 can be used for tracking a listener in a room with two or more loudspeakers 51*a*, 51*b* installed. In this case, the two loudspeakers 51, 51*b* replace the transducers 7*a*, 7*b* of the headphones known from FIG. 1. As described in the previous section, at least two ultrasonic signals from the ultrasonic signal generator 2 are added to the non-modified audio signal from source 1 in the adders 3*a* and 3*b*. The digital to analogue converter DAC 4 converts the signals to the apalogue domain. A transmission line 5, either cable based or wireless, is used to transmit the signals to the two or more loudspeakers 51*a* and 51*b*. The same receivers 8 as described in the previous section can be used to detect the audio and ultrasonic signals. A transmission line 9, again cable based or wireless, propagates the signal to an analogue to digital converter ADC 10. The signal filter and analyser 11 filters out the audio signal and extracts the ultrasonic signals. In this case, the position of the loudspeakers is known and information about the said position is entered into position information block 12 by known means such as digital information fed from a position measurement system or a keyboard here not shown. The information block 12 calculates out of the said extracted ultrasonic signals the position of the receiver 8 which is unknown. This can be done through triangulation given that the positions of the loudspeakers 51*a* and 51*b* as well as the distance between the loudspeakers 51*a* and 51*b* are known.

During sound reproduction, the listener can wear or hold the receiver 8 in any suitable manner and can move in the room surrounding the loudspeakers. The listener cannot hear the ultrasonic signals emitted by the loudspeakers. Nevertheless the receiver 8 can detect them. Therefore, the position information block 12 can keep track of the listener's actual position. Also the position of loudspeakers may be determined depending on the known position of the listener in the same way.

Figure 6:
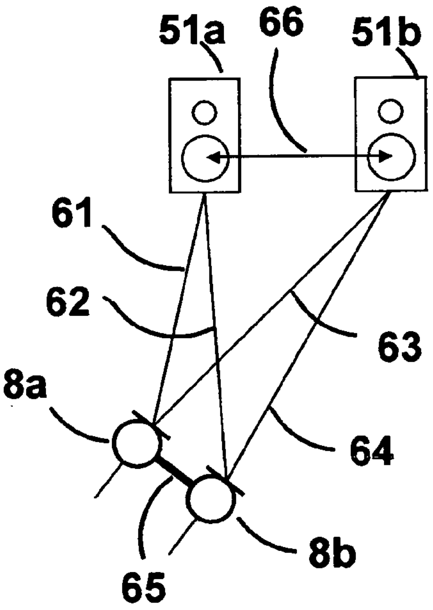

As shown in FIG. 6, the listener may also wear or hold two receivers 8*a* and 8*b*. In this case, not only the position of the listener but also his rotational position or orientation in space can be calculated. In this case, the receivers 8*a*, 8*b* have a fixed distance 65 from each other and are mounted on the same device or holder. The following distances have to be calculated from the measurements of the corresponding delays. The distance 61 from the first loudspeaker 51*a* to the first receiver 8*a*, the distance 62 from the first loudspeaker 51*a* to the second receiver 8*b*, the distance 63 from the second loudspeaker 51 b to the first receiver 8*a* and the distance 64 from the second loudspeaker 51 b to the second receiver 8*b*. Through triangulation the position of both receivers 8*a* and 8*b* can be calculated. In a further embodiment, the non-modified audio signals from source 1 and the ultrasonic signals from generator 2 can also be added in the analogue domain after the DAC 4. In this case, a separate DAC is used to convert the ultrasonic signals from generator 2 to the analogue domain.

The invention claimed is:

1. A method for generating information relating to the relative position of a set of at least three transducers designed for treating acoustic signals, comprising the following steps:

- providing a first electric audio signal to a first transducer for transducing the first electric audio signal to a first acoustic signal,
- providing a second electric audio signal to a second transducer for transducing the second electric audio signal to a second acoustic signal,
- adding a first ultrasonic signal to said first electric audio signal and a second ultrasonic signal to said second electric audio signal before such signals enter said respective first and second transducers,
- producing first and second combined acoustical and ultrasonic signals to be emitted from said first and second transducers,
- sensing said first and second combined acoustical and ultrasonic signals in a third transducer and converting them into an electrical signal,
- filtering out and separating the ultrasonic signals,
- producing a first and a second delay signal from said sensed and filtered first and second ultrasonic signals, and
- computing from said first and second delay signals a signal representing the relative position of at least one transducer with respect to the at least two other transducers of said set of three transducers.

2. A method according to claim 1, wherein two transducers of the set are in a fixed positional relationship, further including the step of computing a signal representing the position of at least one transducer with respect to the at least two other transducers and comprising the orientation of said transducers having a fixed relative positional relationship with respect to the third transducer of the set.

3. A method according to claim 2, wherein the set of transducers comprises four transducers, wherein two transducers for emitting acoustical signals are separated by a fixed first distance, and wherein two transducers for receiving acoustical signals are separated by a fixed second distance, further including the step of computing a signal representing the position and orientation of at least two transducers having a fixed distance in a plane with respect to the at least two other transducers.

4. A method according to claim 3, wherein the set of transducers comprises five or more transducers, wherein a first group of at least three transducers for emitting or receiving acoustical signals are separated by a fixed first distance, and wherein a second group of at least two transducers for emitting or receiving acoustical signals are separated by a fixed second distance, further including the step of computing a signal representing the position of one group of transducers in space with respect to the other group of transducers.

5. Device for performing the method according to claim 1, comprising:

- a first transducer,
- a second transducer,
- a third transducer,
- a digital system connected to said first, second and third transducers and having an output audio path for feeding audio signals to at least one of said first and second transducers and an input audio path, for receiving audio signals from at least said third transducer, a source of audio signals connected to said output audio path, an ultrasonic signal generator connected to the said output audio path in said digital system, and a position information generator connected to the said input audio path in the said digital system.

6. Device according to claim 5, further comprising a signal filter and analyzer connected to the position information generator in said input path.

7. Device according to claim 5, wherein said first and second transducers are part of a headphone and said third transducer is a stationary microphone.

8. Device according to claim 5, wherein said first and second transducers are stationary loudspeakers and said third transducer is a movable microphone.

* * * * *